United States Patent [19]

Goldthorp et al.

[11] Patent Number: 5,063,351
[45] Date of Patent: Nov. 5, 1991

[54] DIGITAL SIGNAL PROCESSING RELATING TO NEAR-END CROSSTALK CABLE MEASUREMENTS

[75] Inventors: Jeffery M. Goldthorp, Parlin; James S. Yeomans, Morristown, both of N.J.

[73] Assignee: Bell Communications Research, Inc., Livingston, N.J.

[21] Appl. No.: 587,241

[22] Filed: Sep. 24, 1990

[51] Int. Cl.$^5$ .................... G01R 27/00; G01R 23/16
[52] U.S. Cl. ................................ 324/628; 324/603; 324/77 R; 379/6; 379/24
[58] Field of Search ............... 379/6, 24; 324/628, 324/603, 627, 615

[56] References Cited

U.S. PATENT DOCUMENTS

| | | | |
|---|---|---|---|
| 3,471,779 | 10/1969 | Ley | 324/603 |
| 3,718,813 | 2/1973 | Williams | 324/603 |
| 3,988,667 | 10/1976 | Roth | 324/603 |
| 4,023,098 | 5/1977 | Roth | 324/77 G |
| 4,973,911 | 11/1990 | Marshall | 324/529 |

OTHER PUBLICATIONS

Hewlett–Packard–1983 Catalog–pp. 508–510–Model 3582A Analyzer.
"Suggested Testing Plan to Determine Line Code Performance", Bell Communications Research, Inc., T1D1.3 Contribution 86–095, Jun. 9, 1986.
"Near-End Crosstalk Model For Line Code Studies", Bell Communications Research, Inc., T1D1.3 Contribution 85–244, Nov. 12, 1985.

*Primary Examiner*—Kenneth A. Wieder
*Assistant Examiner*—Jose M. Solis
*Attorney, Agent, or Firm*—Leonard Charles Suchyta; John T. Peoples

[57] ABSTRACT

An arrangement of digital circuitry is disclosed for testing a cable communication system to determine its performance when subjected to near-end cable crosstalk. The circuitry digitally generates a crosstalk signal indicative of the combined effect of one or more interfering sources and the near-end crosstalk coupling path linking the interfering sources with the system-under-test. The circuitry includes a pseudo-noise sequence generator for producing a stream of bits that are normally distributed and a digital filter, responsive to the sequence generator, for implementing a frequency characteristic corresponding to the spectral content of the interfering source as weighted by the near-end crosstalk path.

18 Claims, 10 Drawing Sheets

100

200

DIGITAL SIGNAL PROCESSING RELATING TO NEAR-END CROSSTALK CABLE MEASUREMENTS

FIELD OF THE INVENTION

The invention relates generally to cable transmission systems and, more specifically, to digital signal processing circuitry for measuring spectral compatibility of transmission systems.

BACKGROUND OF THE INVENTION

In the telecommunication art, the term "crosstalk" refers to interference that enters a message channel from one or more other channels through a path coupling the message channel with the interfering channels. Crosstalk can create annoyance in a voice system or errors in a data system. Crosstalk's impact depends upon such factors as the listener's hearing acuity, the extraneous noise, the frequency response characteristic of the coupling path, and the level of the disturbing signal.

In wire cable technology, coupling between wire pairs—the signal propagation medium—occurs because of imperfections in the physical composition of the cable itself. Energy on one wire pair is electromagnetically coupled to the other wires due to the unbalances caused by the imperfections. This induced coupling has several manifestations, including: the coupling varies randomly from cable-to-cable and even from wire pair-to-wire pair in a given cable; and the coupling depends on the terminating impedances of the wire pairs and on the total length of exposure, i.e., electrical distance of the wire pairs.

There are generally two types of crosstalk mechanisms that are characterized, one being the near-end crosstalk (NEXT) and the other far-end crosstalk (FEXT). NEXT results from a distrubing source connected at one end of the wire pair causing interference in the message channel at the same end as the disturbing source. FEXT is that portion of the disturbing signal propagated to far end of the message channel, that is, the end opposite to the end to which the disturbing source is connected.

In full-duplex loop transmission systems, NEXT compatibility is the dominant concern to ensure proper performance of a communication system, and this is especially true today since a multitude of systems with different spectral characteristics compete to provide integrated data-voice services. In one conventional measurement approach, NEXT is evaluated using computer simulations of the crosstalk impairment to estimate the the NEXT margin in a variety of scenarios. The NEXT margin in a digital system refers generally to the increase in level of the interfering source, relative to a predetermined reference condition, that causes a preselected error rate. The margin provides a measure of the "robustness" of performance for a given system when exposed to crosstalk from another system. Given the right technical information about the systems under study, such estimates can be quite accurate. In fact, because the NEXT model inherently contains information from a statistically meaningful sample of crosstalk paths, an analytical model of the impairment is possibly more valuable than appropriate measurements of the actual NEXT margin based on a statistically insignificant sample.

However, even the best computer simulations benefit from experimental verification. Before a simulation can be used to explore the performance of a system, there must be a high degree of assurance that the simulation accurately characterizes the system. Accordingly, measurement of NEXT margins between loop transmission systems is a fundamental component to support the spectrum management process. Unfortunately, current conventional techniques for achieving empirical verification are awkward and expensive. Even the best method currently available falls short of satisfying the levels of speed and flexibility required when the analysis of a large number of systems with different signal formats is contemplated.

SUMMARY OF THE INVENTION

These shortcomings as well as other limitations and deficiencies are obviated in accordance with the present invention by digital NEXT generation circuitry which readily engenders the speed and versatility necessary for a spectrum management program.

In accordance with the broad aspect of the present invention, NEXT for a system-under-test (SUT), which utilizes a selected set of wires, is measured with circuitry that includes: a digital noise generator for producing a stream of white, Gaussian-distributed discretized noise samples; and digital filter means for processing the noise samples to produce a signal which can be coupled to the selected set of wires used by the SUT. The frequency characteristic of the digital filter corresponds to the combined spectral content of the interfering sources as well as the NEXT path coupling the interfering sources to the selected set of wires as inferred from actual cable measurements and modeled in the frequency domain. The output of the digital filter, after conversion to analog form, is injected into the selected set of wires at a prescribed location, typically the input the receiver of the SUT.

The features of the present invention include: (i) the required NEXT digital filter can be designed quickly and with relative ease by utilizing digital filter design packages; (ii) NEXT interference frequency characteristics can be changed simply, such as by downloading filter coefficients from a library of pre-designed filters characteristics to the digital signal processor performing the digital filtering; and (iii) the entire test system can be placed under computer control so that test routines can be devised to automatically execute a complete NEXT compatibility analysis of a system in the presence of a variety of sources and NEXT coupling environments—this is significant because NEXT tests can take minutes to hours to even days, depending on the system-under-test.

The organization and operation of this invention will be understood from a consideration of the detailed description of the illustrative embodiment, which follows, when taken in conjunction with the accompanying drawing.

DETAILED DESCRIPTION

By way of introducing terminology and notation useful in elucidating the present invention, two pertinent prior art techniques for measuring near-end crosstalk (NEXT) are first discussed in overview fashion.

Prior Art

Figure 1:
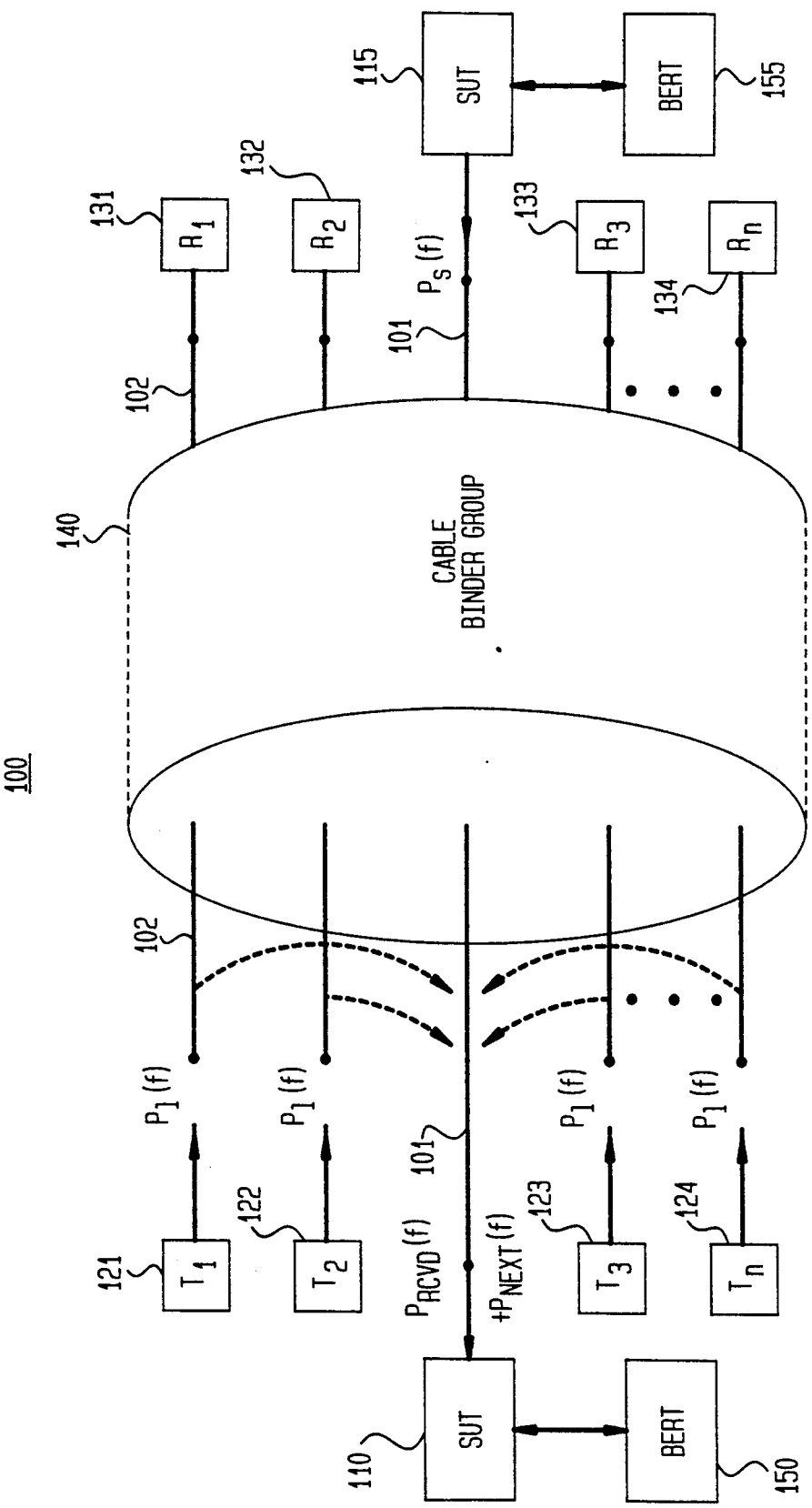
FIG. 1 is a prior art block diagram for the analog measurement of near-end cable crosstalk with multiple interfering sources.

Circuit diagram 100 of FIG. 1 illustrates a conventional NEXT measurement technique referred to as "barrage testing". The system-under-test (SUT), comprising receiver 110 and companion transmitter 115, utilizes transmission pair 101 in cable binder group 140 for signal propagation. The SUT is exposed to NEXT from a group of interfering transmitters 121-124 (also referred to as transmitters $T_1, T_2, \ldots, T_n$) operating in the same binder group 140 composed of numerous cable pairs, say for example, 50 cable pairs. These transmitters have associated receivers 131-134 (also referred to as receivers $R_1, R_2, \ldots, R_n$). Transmitter 115 provides a signal at the input of transmission pair 101 which is characterized in the frequency spectral domain by $P_S(f)$. $P_S(f)$ is transformed to $P_{RCVD}(f)$ at the input to receiver 110 by the propagation characteristics of pair 101. In a similar manner, $T_1$ provides a signal at the input of transmission pair 102 which is characterized in the spectral domain by $P_1(f)$. The combined effect of all interfering transmitters, each having a spectral signal $P_i(f)$, at the input to receiver 110 due to NEXT coupling is designated in the spectral domain by $P_{NEXT}(f)$. Actual errors in the SUT, caused by NEXT interference or even the malfunctioning of transmitter 115 and/or receiver 110, are measured with Bit-Error Rate Tester (BERT) companion pair 150,155; the BERT testing technique is well-known in the art of measuring errors in a digital system. This "barrage testing" approach suffers from several drawbacks: (i) to simulate worst case conditions, a large number of interfering sources are needed, so the associated equipment costs are high; (ii) each interfering source must be driven by a statistically independent data source, but data terminal emulators, which implement the interfering transmitters, are expensive; (iii) assuming that each measurement would require a minimum of several hours to make, it would be impractical to repeat the measurement often enough to obtain a statistically significant number of different coupling configurations; and (iv) because the interference level can be changed only in discrete amounts by adding other crosstalk sources, there is no method of "fine tuning" this critical parameter. Consequently, it is impossible to make an accurate measurement of the SUT's NEXT margin.

Figure 2:
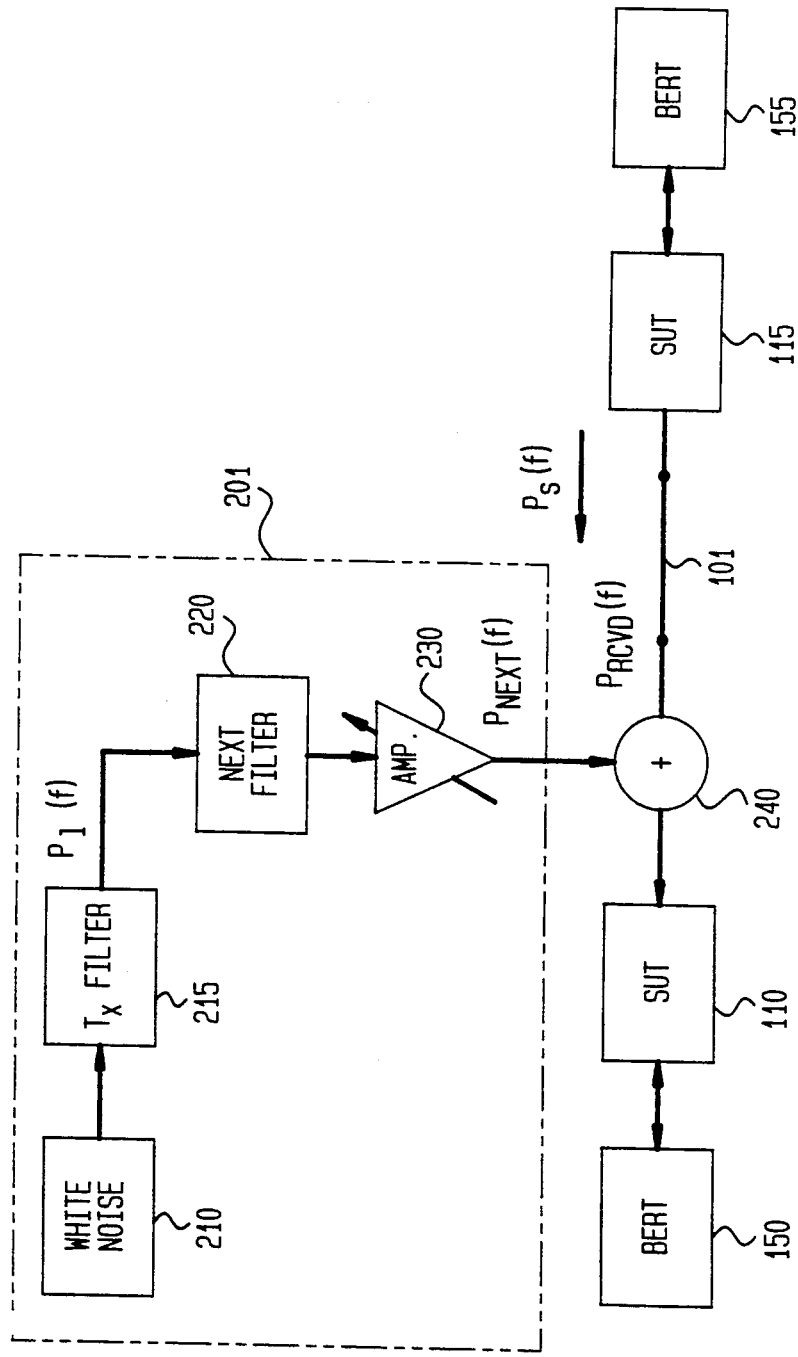
FIG. 2 is a prior art block diagram for the analog measurement of near-end cable crosstalk with a single interfering white-noise source and filter shaping.

One recently suggested practical alternative to the "barrage" technique is illustrated by circuitry 200 in FIG. 2 (elements from FIG. 1 which are identical in FIG. 2 have the same reference numerals). This technique was disclosed in T1D1.3 Contribution 86-095 addressing "Suggested Testing Plan to Determine Line Code Performance." As disclosed in the Contribution, NEXT interference is simulated by passing white, Gaussian noise generated by source 210 through a filter cascade composed of transmit filter 215 and NEXT filter 220. Filter 215 (also referred to as the $T_X$ filter) shapes the noise from source 210 to match the power spectral density $P_i(f)$ that each interfering transmitter (e.g., 121 of FIG. 1) generates onto its associated pair. Filter 220 (also referred to as the NEXT filter) shapes the output from the $T_X$ filter according to a NEXT transfer function. This empirically-based transfer function characterizes the statistical 1% most severe NEXT power sum, caused by 49 disturbers in a 50-pair binder group, as a function of frequency. Information relating to a family of transfer function characteristics is in the public-domain (e.g., T1D1.3 Contribution 85-244 addressing "Near-End Crosstalk Model for Line Code Studies"). Finally, the shaped noise from filter 220 serves as the input to buffer amplifier 230, and the output of amplifier 230, which is the desired $P_{NEXT}(f)$, is injected into working receiver 110 through summer 240. The other input to summer 240 is the spectral signal $P_{RCVD}(f)$ received as the output from real pair 101.

This suggested technique avoids many of the problems of the "barrage testing" technique. The method is less hardware intensive. Also, a new NEXT environment can be obtained merely by incorporating another transmitter filter 215. Moreover, by adjusting the NEXT level by varying the gain of amplifier 230 until a given Bit Error Rate (BER) threshold is exceeded, an explicit measurement of the NEXT margin is obtained. Finally, use of a hardware realization of the 1% NEXT transfer function in place of a small sample of crosstalk configurations gives the data statistical meaning. However, this second technique still has its shortcomings since it lacks the flexibility to perform a variety of measurements. One major limitation is the use of analog filtering to generate the NEXT interference. The complex analog filters required are not presently available to match the variety of systems to be tested.

PRESENT INVENTION

I. Overview

Figure 3:
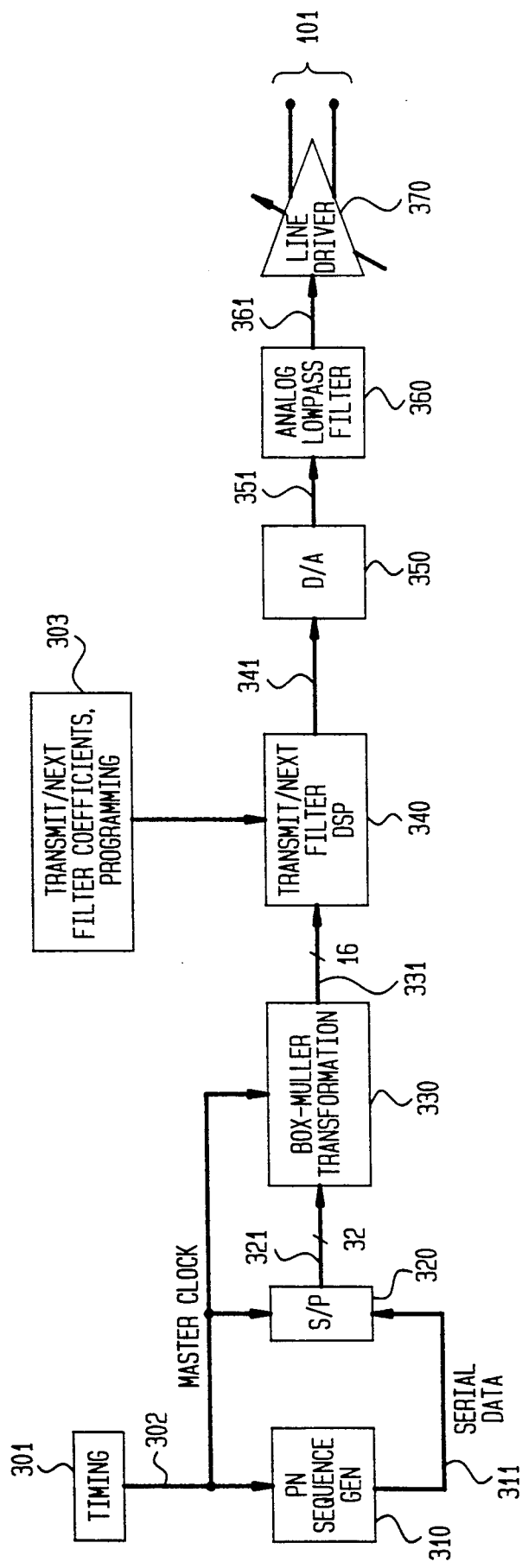
FIG. 3 is a block diagram of an arrangement in accordance with the present invention for measuring near-end crosstalk (NEXT) using digital signal processing circuitry.

Digital network 300 depicted in FIG. 3 illustrates circuitry for measuring NEXT interference in accordance with the present invention and serves to replace the components contained within block 201 of FIG. 2. With reference to FIG. 3, a pseudo-noise (PN) sequence generator 310 produces a random bit stream on serial lead 311. The bit stream on lead 311 is converted from serial-to-parallel form in S/P converter 320. As a result of the conversion, generator 310 produces N-bit blocks on bus 321 that are uniformly distributed between $-2^{N-1}$ to $(2^{N-1}-1)$. Typically, N=16. A normalizing transformation is performed by transform circuit 330 on the output of converter 320 to generate random variables that fit a Gaussian distribution, thereby approximating a white noise source. The random variable stream is communicated to transmit filter Digital Signal Processor (DSP) 340 via bus 331.

Figure 4:
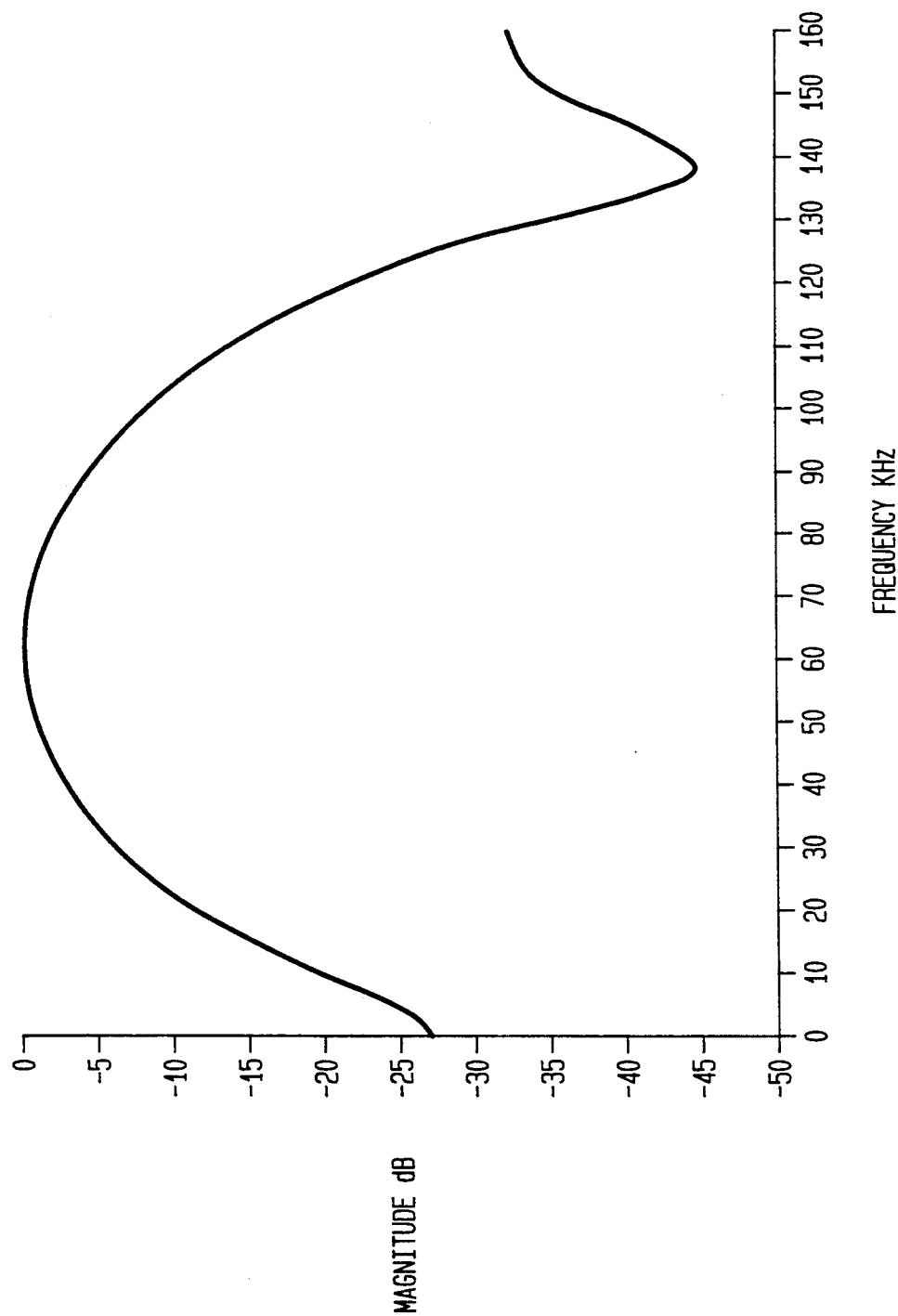
FIG. 4 depicts a representative spectral content for a given signal format normalized to 0 dBm.
Figure 5:
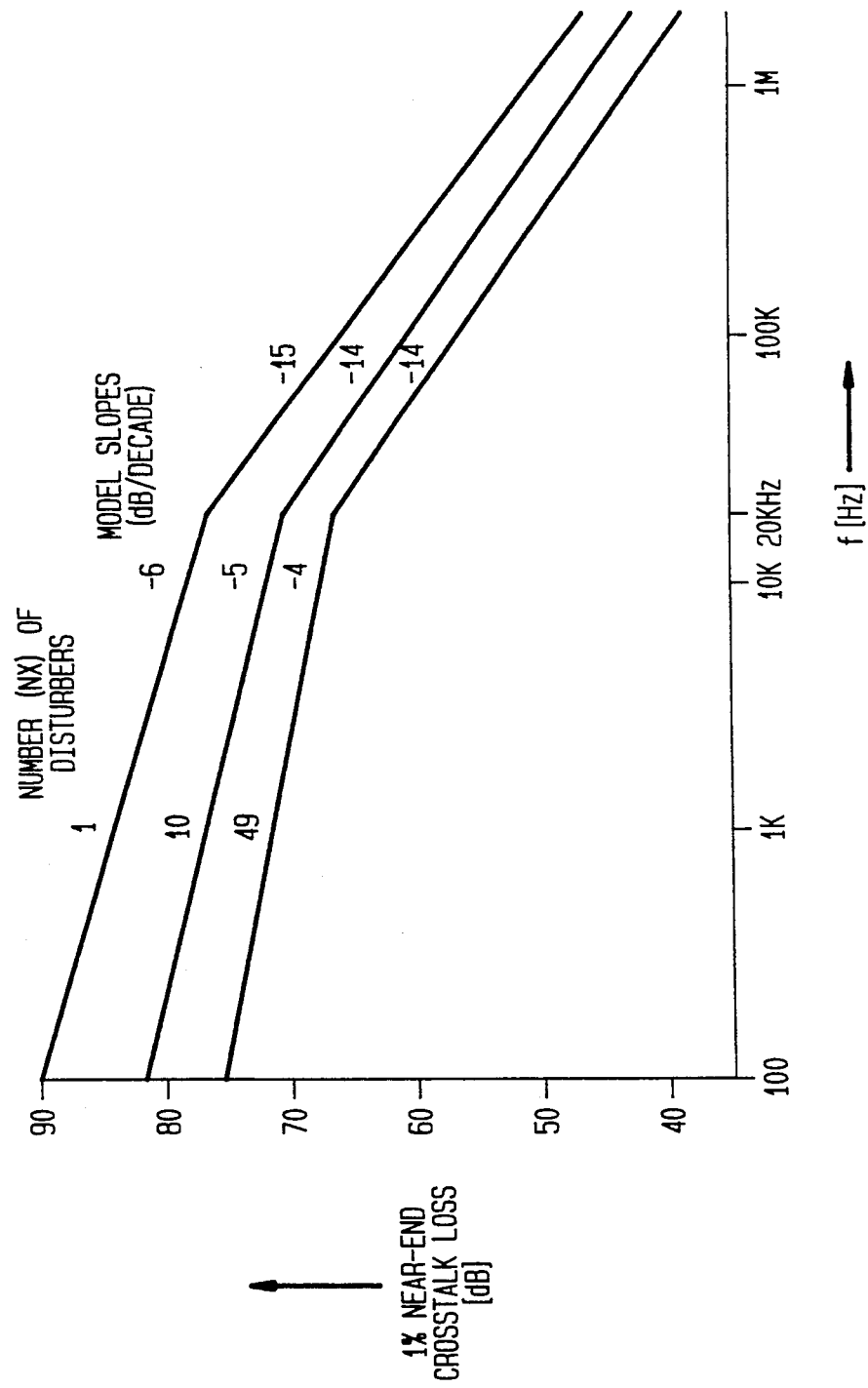
FIG. 5 illustrates a family of NEXT transfer function characteristics for a predetermined wire cable.

The complete signal processing required to filter the noise samples from generator 310 into a discretized replica of NEXT for a particular system is performed by DSP 340; this means that the processing formerly implemented by two distinct analog filters in cascade can readily be effected by just one digital signal processing stage. The overall spectral characteristic required of this digital processing stage is representative of the combined effect of the interfering source spectral shaping and the NEXT spectral shaping. As an example of the technique of generating this overall characteristic, an exemplary "template" for the spectral content of one type of signal format is depicted in FIG. 4. The energy in the exemplary signal covers the range from DC to about 160 kHz. The NEXT transfer function for three interfering conditions is shown in FIG. 5; the particular cable system under investigation is 18 kft. of 22 gauge cable with each cable pair terminated in its characteristic impedance. The curves depict the 1% NEXT loss for 1, 10 and 49 disturbers or interfering sources. The transfer function usually approximated by DSP 340 for the given signal format is the cascade of the transfer functions depicted in FIG. 4 and and the "49 disturber" curve of FIG. 5, respectively; on a dB basis, the required overall transfer function is merely found by adding the separate transfer functions for the signal format and the NEXT coupling.

Finally, the NEXT sequence from DSP 340 is converted to an analog waveform by Digital-to-Analog (D/A) converter 350 and by reconstruction lowpass filter 360, and then coupled to pair 101 via balanced, high impedance, line driver 370.

The clock signal for elements 310, 320 and 330 is provided by timing generator 301 over leads 302. In addition, to effect the desired versatility of implementing a test system which can be used to test numerous signal formats, DSP 340 can be directly loaded with filter coefficients from processor 303. Each set of coefficients applies to a particular transmission system, and the coefficient sets can be interchanged swiftly, under computer control, thereby realizing the objective of flexibility.

II. Specifics

Figure 6:
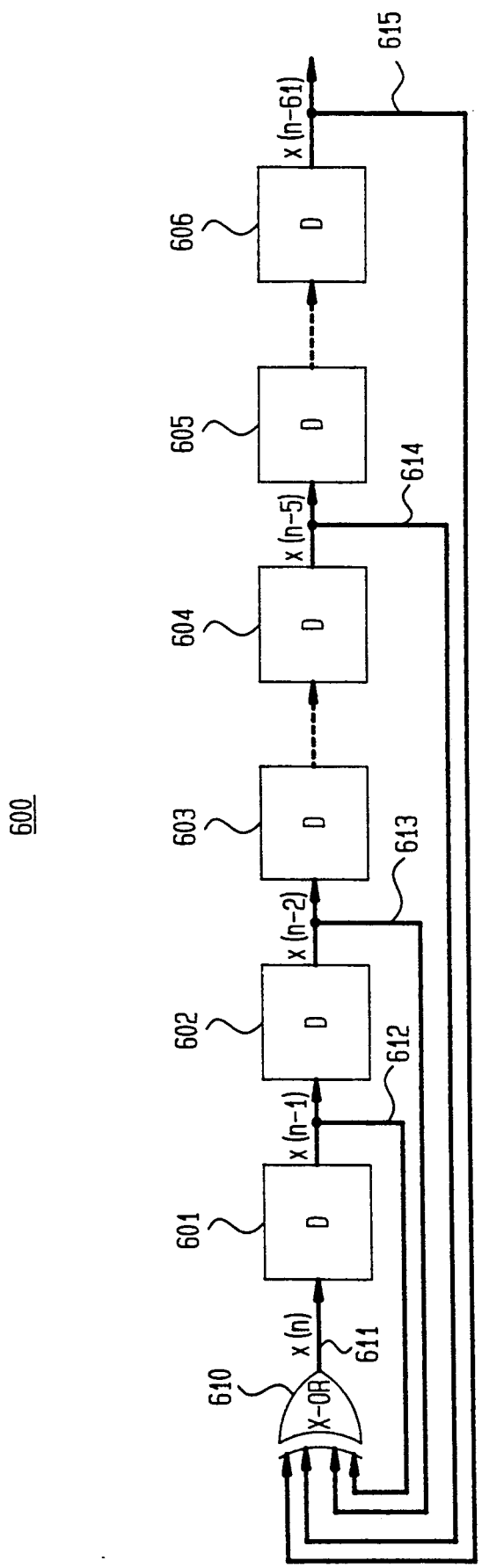
FIG. 6 is a block diagram of digital components utilized to generate a discretized, pseudo-noise sequence.
Figure 7:
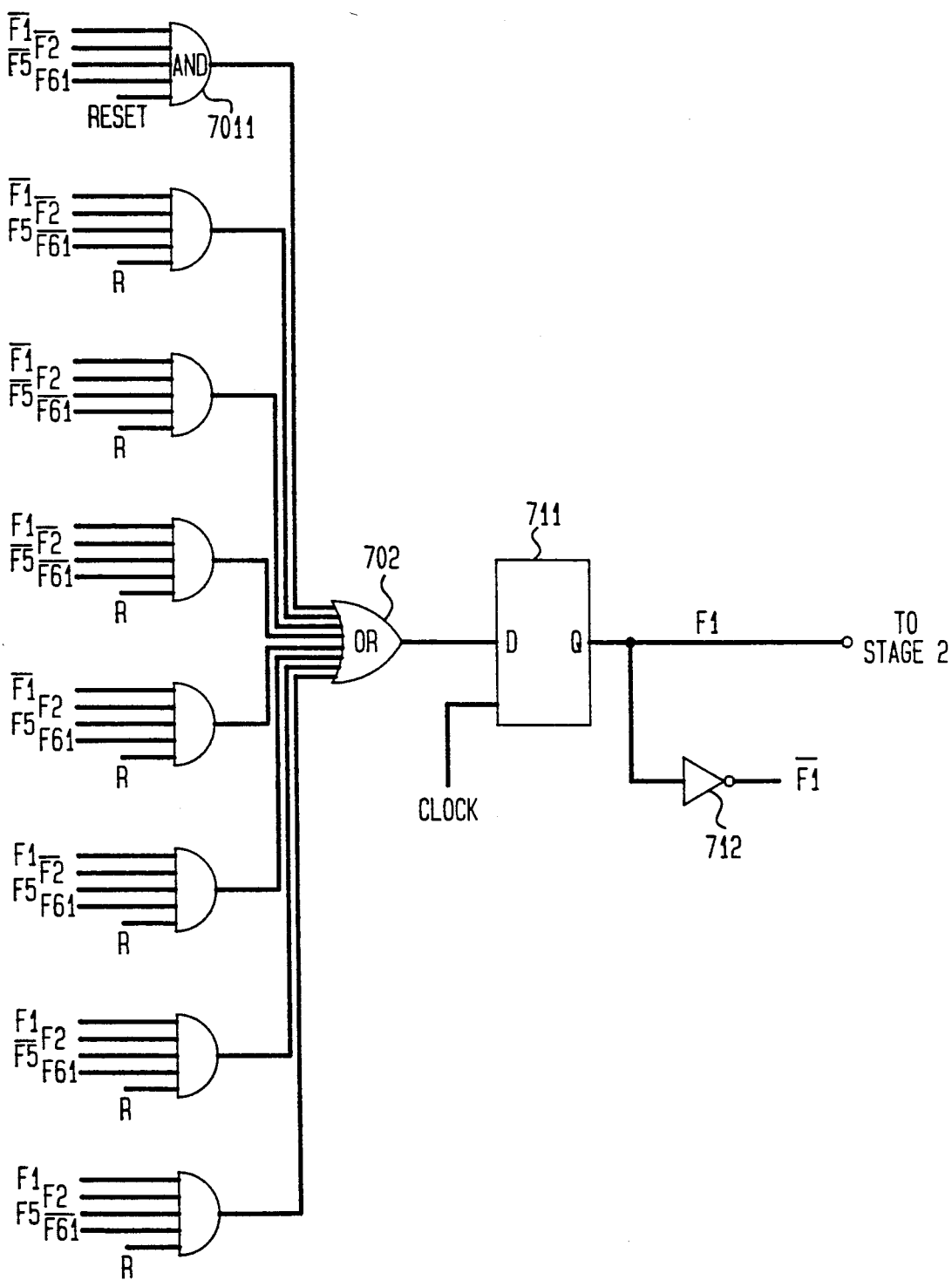
FIG. 7 is a circuit diagram illustrative of a portion of one of the digital components from FIG. 6.

Pseudo-noise generator 310 of FIG. 3 may be realized, as depicted in block diagram form by circuitry 600 in FIG. 6, by multi-input exclusive-OR device 610 coupled to the cascade of digital delay devices 601-606. The inputs to device 610 are fed back from the outputs of devices 601, 602, 604, and 606 on leads 612-615, respectively. Circuitry 600 implements the polynomial $x^{-1}+x^{-2}+x^{-5}+x^{-61}$, which produces a bit stream on lead 611 that is cyclostationary, repeating itself ever $2^{61}-1$ bits ($3.66\times 10^3$ years at 20 Mhz). One actual realization of circuitry 600 may be accomplished using a cascade of Programmable Logic Devices (PLD), such as the device EP900 commercially available from the Altera Corp. The detailed circuit diagram of FIG. 7, which depicts the front end of the PLD cascade, illustrates that exclusive-OR device 610 is realized by AND gates 701 and OR gate 702, and the first delay stage 601 essentially realized by flip-flop 711 and inverter 712. Gates 701 and 702 are arranged so that all logic zeros, or all logic ones, or an even number of logic zeros from delay devices 601, 602, 604 and 606 produce a logic zero output from OR gate 702, whereas an odd number of logic zeros result in a logic one output from gate 702. For example, AND gate 7011 produces a logic one whenever the outputs from devices 601, 602 and 604 are logic zero and the output from device 606 is a logic one. Finally, pseudo-noise generator 310 is arranged so that the same start-up sequence or seed number, namely, alternating logic one and zero levels, is used as the initial condition upon power-up.

To generate Gaussian random variables from a uniformly distributed population, the Box-Muller transformation is used. Given two uniformly distributed random variables, the Box-Muller transformation generates two Gaussian random variables using the relation presented below:

$$N_1 = (-2\ln R_1)^{\frac{1}{2}} \cos(2\pi R_2)$$

$$N_2 = (-2\ln R_2)^{\frac{1}{2}} \sin(2\pi R_1)$$

where $R_1$ and $R_2$ are the two uniformly distributed random variables. However, the two resulting Gaussian random variables $N_1$ and $N_2$ are highly correlated. Thus only one can be used by the signal processing circuitry. This means that PN generator 310 is clocked at twice the normal rate to generate $R_1$ and $R_2$ so as to produce a stream of uncorrelated Gaussian variables at the normal rate.

Figure 8:
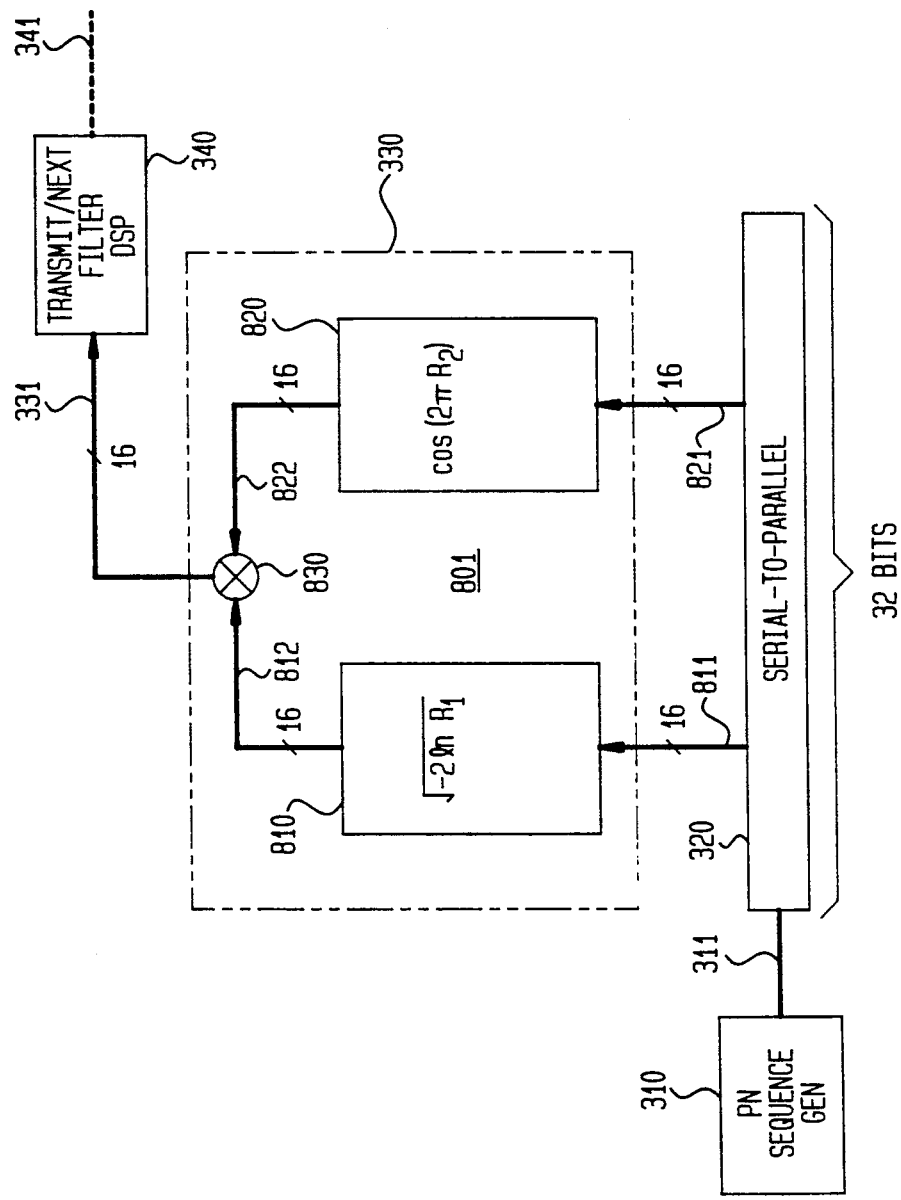
FIG. 8 is a block diagram representation of an arrangement to generate Gaussian distributed random variables from a sequence of uniformly distributed random variables on a discretized basis.

The circuitry depicted in FIG. 8 shows one embodiment for the practical realization of the Box-Muller transformation in order to achieve the processing speed required for the given interference signal formats. Those elements from FIG. 3 which are identical in FIG. 8 have the same reference numerals. Box-Muller transformation means 330 is basically implemented by memory means 801, composed of distinct memory devices 810 and 820, and by multiplier 830. Serial-to-parallel converter 320 receives and stores 32-bit blocks as produced by generator 310, and converter 320 is further arranged to provide two independent 16-bit outputs via buses 811 and 821, respectively. The data on bus 811, which represents random variable $R_1$, is treated as an address pointer to data stored in memory 810; similarly, the data on bus 821, which represents random variable $R_2$, points to data stored in memory 820. Memory device 810 stores data relating to the logarithmic transformation between the incoming data on bus 811 and the output data appearing on bus 812. In a similar manner, memory device 820 stores data relating to the cosinusoidal transformation between the incoming data on bus 821 and the output data appearing on bus 822. As an example of the transformation mechanism, it is supposed that bus 811 has the following bit pattern: 000000001111111, which is 255 in decimal format. The contents of the address pointed at by this exemplary bit pattern contains the logarithmic transformation of this pattern treated as a number between 0.0 and 1.0. To find this number, which is generated off-line and then stored into memory device 810, the bit pattern is divided by $2^{16}-1$ (the equivalent of dividing 255 by 65536, which results in 0.00389). The logarithm transformation on the resultant quotient leads to the number stored at the pointed-to address, namely, 3.33139 on a decimal basis or 0011010101001101 (354D Hex) on a bit basis. The first bit position is the sign bit, whereas the last 15 positions represent the magnitude. The numbers stored by memory 810 range from 0.0 to 4.7096 on a decimal basis. In a similar manner, memory 830 stores numbers in bit format which represent the range of the cosine between 0.0 and $2\pi$.

In designing the digital filter based on a spectral "template" illustrated in FIG. 4, data indicative of the power spectral density that the system transmits on its wire pair as weighted by the NEXT coupling depicted in FIG. 5 for the 49 disturber condition is produced. A normalized version of this spectrum is then further weighted by the Kaiser window, and the resultant spectrum then serves as the basis to generate coefficients for a fifteen tap filter with 16-bit quantization. Table I below lists the digital filter coefficients for the FIR realization (the coefficients shown are unscaled and fall in the range $-32768$ to $32767$, corresponding to 16 bits; the actual FIR tap weights are the numbers listed divided by 32768):

TABLE I

| Coefficient | Unscaled Value |
|---|---|
| 1 | $-8$ |
| 2 | $-106$ |
| 3 | $-10$ |
| 4 | $-459$ |
| 5 | $-81$ |
| 6 | $-12694$ |
| 7 | 390 |
| 8 | 28164 |
| 9 | 390 |
| 10 | $-12694$ |
| 11 | $-81$ |
| 12 | $-459$ |
| 13 | $-10$ |
| 14 | $-106$ |
| 15 | $-8$ |

To realize the filter design, DSP 340 hardware must be capable of executing a 15-tap FIR filter at a 320 KHz minimum sampling rate. A representative commercially available device that can operate at the required execution speed is the TMS320C25, supplied by Texas Instruments. (With a 105 nsec cycle time, this device can execute 30 instruction cycles, which include the 15 FIR taps and 15 overhead instructions necessary for input-/output and memory management).

Figure 9:
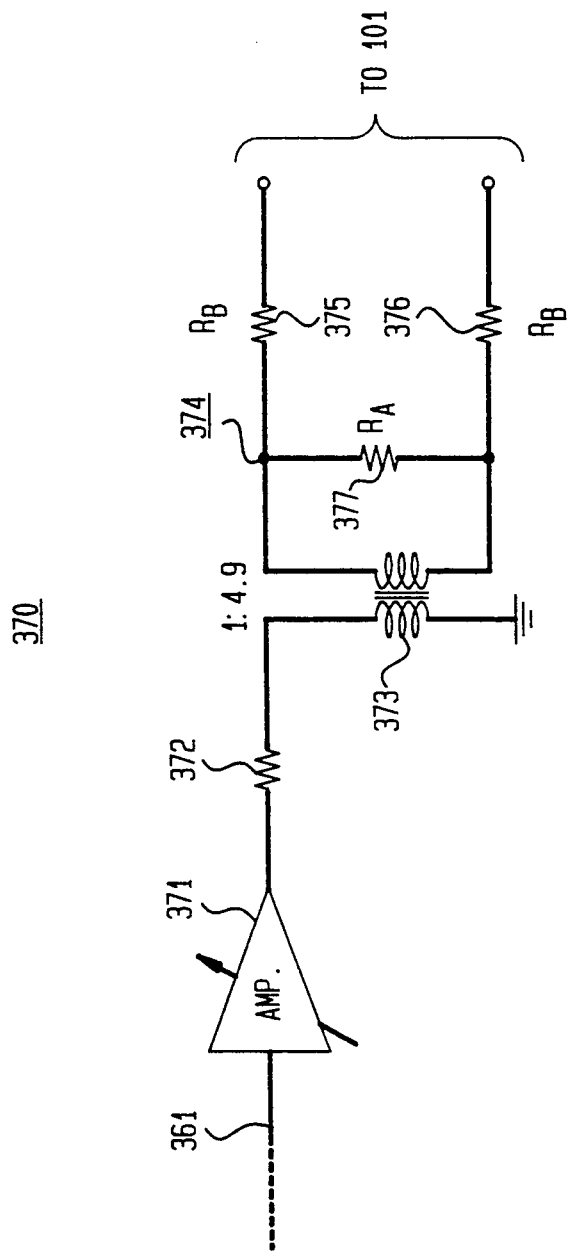
FIG. 9 is a block diagram of a line driver to couple the generated NEXT energy onto a real cable.

The circuitry in FIG. 9 illustrates one embodiment for line driver circuit 370 of FIG. 3. It is important to be able to couple to real wire pair 101 in a balanced mode and in a manner so as not to disturb the impedance terminating wire pair 101, but yet it is desirable to couple as much energy into pair 101 so as to be able to measure the NEXT margin. This is accomplished by unbalanced-to-balanced coupling transformer 373 and resistive coupling circuit 374, composed of shunt resistor 377 ($R_A$) and series resistors 375 and 376 (both designated as $R_B$), which is coupled to the balanced side of transformer 373. Series resistors 375 and 376 and shunt resistor 377 are selected based upon the power level selected for the test. The power level is determined primarily by amplifier 371 in series with output resistor 372 driving the unbalanced side of transformer 373. The following table lists certain resistance values along with the coupling loss caused by switching in these component values.

TABLE II

| $R_A$ | $R_B$ | Coupling loss |
|---|---|---|
| 2860 | 1000 | 15.92 |
| 1971 | 1500 | 19.35 |
| 1702 | 2000 | 21.80 |
| 1572 | 2500 | 23.71 |

TABLE II-continued

| $R_A$ | $R_B$ | Coupling loss |
|---|---|---|
| 1496 | 3000 | 25.27 |

In the illustrative embodiment, amplifier 371 may be implemented with the LH4101 Wideband High Current Operation Amplifier commercially available from National Semiconductor Corp.; this amplifier is capable of providing 200 mA peak and 100 mA continuous output current. Line driver 370 is limited to 100 mA maximum current with the input limited to the range of $\pm 10$ volts and a load of 100 ohms. In an exemplary signal format, line driver 370 provides 8 dBm total power to resistive coupling circuitry 374, which in turn delivers $-8$ dBm to disturbed pair 101 using the values listed in the first row of TABLE II. Line driver 370 can generate sufficient power to determine relatively large positive NEXT margins. For the zero margin condition of the exemplary signal format, the output power of line driver 370 is determined by: (i) measuring the transmit power spectral density of the exemplary system; (ii) calculating the 1% NEXT power spectral density of the exemplary system, and (iii) calculating the power sum of this 1% NEXT power spectral density. For the exemplary system, this process yields a NEXT power of $-57$ dBm.

Figure 10:
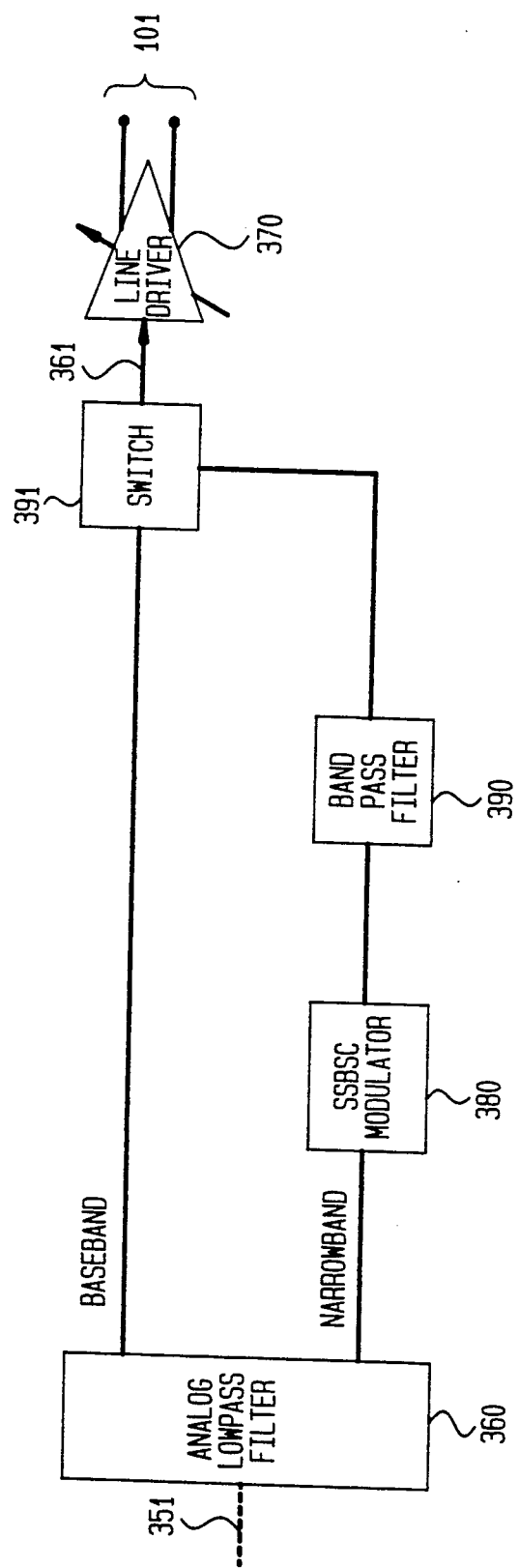
FIG. 10 is a block diagram of circuitry for generating NEXT from a narrowband interfering source.

Wire-based transmission systems are oftentimes categorized as baseband or narrowband systems. Baseband systems have spectral energy occupying a relatively wide frequency band (from DC), such as depicted in FIG. 4. These baseband systems employ a variety of digital line codes including AMI, 2B1Q, and Biphase—the signal format with the spectral content illustrated in FIG. 4 is an example of the biphase line code and has spectral energy in the 0-160 KHz band. On the other hand, narrowband systems have energy concentrated in approximately a 25 KHz band around a carrier frequency and generally make use of the Frequency Shift Keyed (FSK) modulation technique. Because the spectral roll-offs of narrowband systems are much steeper than those of baseband systems, additional signal processing circuitry is interposed in circuitry 300 of FIG. 3 to effect a realizable simulation system with the requisite speed and versatility. The additional processing circuitry is depicted in FIG. 10 by single-sideband, suppressed carrier (SSBSC) modulator 380, band-pass filter 390 and switch 391. The shaping of the narrowband NEXT energy is performed at low-frequencies to enable a slower sample rate. This allows digital signal processor 340 to perform more instructions between samples, yielding a higher order filter. The spectrum is then modulated to the proper carrier frequency using modulator 380 and band-passed filtered in the frequency range of interest with filter 390. The input into line driver 370, as provided on lead 361, is selected via switch 391 depending upon the type of system—baseband or narrowband—being generated.

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangements described herein are not limited to the specific forms shown by way of illustration, but may assume other embodiments limited only by the scope of the appended claims.

What is claimed is:

1. Circuitry for testing a wire cable communication system including a system-under-test (SUT) utilizing a first set of wires, said circuitry generating an interference signal corresponding to at least one interference source utilizing a second set of wires, said circuitry comprising
   means for digitally generating a discrete white noise source,
   filter means for digitally filtering said noise source to produce said interference signal, said filter means having an input-to-output frequency transfer function characteristic representative of the combined spectra of the at least one interference source and a near-end crosstalk path between the first and second set of wires, and
   means for injecting the interfering signal into the SUT at a prescribed location along the first set of wires.

2. The circuitry as recited in claim 1 wherein said means for digitally generating a discrete white noise source includes
   a pseudo-noise sequence generator producing a first discretized random sequence of uniformly distributed random numbers, and
   means for transforming said first random sequence into a second random sequence of normally distributed random numbers to produce said white noise source.

3. The circuitry as recited in claim 2 wherein said means for transforming implements the Box-Muller transformation.

4. The circuitry as recited in claim 3 further including memory means for storing numbers representative of the results of the Box-Muller transformation and said means for transforming converts said first sequence to said second sequence by addressing said memory means with said first sequence to locate the second sequence in said memory means.

5. The circuitry as recited in claim 4 wherein said means for transforming further includes serial/parallel means, coupled to said pseudo-noise sequence generator, for supplying said first random sequence to said memory means.

6. The circuitry as recited in claim 1 wherein said filter means includes a FIR filter.

7. The circuitry as recited in claim 6 further comprising coefficient memory means for storing sets of filter coefficients for said FIR filter, each of said sets of filter coefficients corresponding to a predetermined interference signal.

8. The circuitry as recited in claim 7 further including means for downloading each of said sets of coefficients to said digital filter means.

9. The circuitry as recited in claim 1 further comprising modulation means for shifting said input-to-output frequency characteristic to a predetermined spectral location.

10. Circuitry for testing a wire cable communication system including a system-under-test (SUT) utilizing a first set of wires, said circuitry generating an interference signal corresponding to at least one interfering source utilizing a second set of wires, said circuitry comprising
    means for digitally generating a discrete white noise source,
    digital filter means for filtering said noise source, said filter means having an input-to-output frequency transfer function characteristic representative of the combined spectra of the at least one interfering source and a near-end crosstalk path between the first and second set of wires, and
    means for analog filtering the output of said digital filter means to produce the interference signal and for injecting the interference signal into the SUT at a prescribed location along the first set of wires.

11. The circuitry as recited in claim 10 wherein said means for digitally generating a discrete white noise source includes
    a pseudo-noise sequence generator producing a first discretized random sequence of uniformly distributed random numbers, and
    means for transforming said first random sequence into a second random sequence of normally distributed random numbers corresponding to said white noise source.

12. The circuitry as recited in claim 11 wherein said means for transforming implements the Box-Muller transformation.

13. The circuitry as recited in claim 12 further including memory means for storing numbers representative of the results of the Box-Muller transformation and said means for transforming converts said first sequence to said second sequence by addressing said memory means with said first sequence to locate the second sequence in said memory means.

14. The circuitry as recited in claim 13 wherein said means for transforming further includes serial/parallel means, coupled to said pseudo-noise sequence generator, for supplying said first random sequence to said memory means.

15. The circuitry as recited in claim 10 wherein said digital filter means includes a FIR filter.

16. The circuitry as recited in claim 15 further comprising coefficient memory means for storing sets of filter coefficients for said FIR filter, each of said sets of filter coefficients corresponding to a predetermined interference signal.

17. The circuitry as recited in claim 16 further including means for downloading each of said sets of coefficients to said digital filter means.

18. The circuitry as recited in claim 10 further comprising modulation means for shifting said input-to-output frequency characteristic to a predetermined spectral location.

* * * * *